United States Patent
Subbayya et al.

(10) Patent No.: US 12,540,697 B2
(45) Date of Patent: Feb. 3, 2026

(54) HYDRAULIC COUPLING DEVICE

(71) Applicant: Tesla, Inc., Austin, TX (US)

(72) Inventors: Vivek Subbayya, Mountain View, CA (US); Andrew Pires, San Francisco, CA (US); Mohamed Ibrahim, San Jose, CA (US)

(73) Assignee: Tesla, Inc., Austin, TX (US)

( * ) Notice: Subject to any disclaimer, the term of this patent is extended or adjusted under 35 U.S.C. 154(b) by 316 days.

(21) Appl. No.: 18/551,370

(22) PCT Filed: Apr. 19, 2022

(86) PCT No.: PCT/US2022/025398
§ 371 (c)(1),
(2) Date: Sep. 19, 2023

(87) PCT Pub. No.: WO2022/225970
PCT Pub. Date: Oct. 27, 2022

(65) Prior Publication Data
US 2024/0167598 A1    May 23, 2024

Related U.S. Application Data

(60) Provisional application No. 63/177,568, filed on Apr. 21, 2021.

(51) Int. Cl.
*F16L 33/30*    (2006.01)
*B60L 58/26*    (2019.01)
(Continued)

(52) U.S. Cl.
CPC ............... *F16L 33/30* (2013.01); *B60L 58/26* (2019.02); *F28F 9/0258* (2013.01);
(Continued)

(58) Field of Classification Search
CPC ...... F16L 33/30; H01M 10/613; F28F 9/0258; F28F 9/0256; F28F 2275/18; F28F 2275/14; F28F 2280/10
See application file for complete search history.

(56) References Cited

U.S. PATENT DOCUMENTS 4,310,184 A  *  1/1982  Campbell ............ B29C 66/1142
                                                   285/423
4,875,719 A  *  10/1989  Mylett ................... F16L 31/00
                                                   285/259

(Continued)

FOREIGN PATENT DOCUMENTS

FR          3080166 A1    10/2019
WO   WO-2007103128 A2 *  9/2007  .......... F16L 25/0036
(Continued)

OTHER PUBLICATIONS

International Search Report and Written Opinion dated Jul. 22, 2022 in PCT Application No. PCT/US2022/025398 in 14 pages.

*Primary Examiner* — Jon T. Schermerhorn, Jr.
(74) *Attorney, Agent, or Firm* — Knobbe, Martens, Olson & Bear, LLP

(57) ABSTRACT

Coupling devices (100) useful for fluidly connecting components of products, such as vehicle coolant components, are described. The coupling device may be press-fit onto male barb interfaces and thereby create a robust and durable liquid-tight seal, and may allow for autonomous factory installation. The coupling device may include an internal material (102), an external material (104), flared ends (106) connected by a cylindrical intermediary portion (108) and a hollow interior portion (110), wherein a hardness of the internal material is less than a hardness of the external material.

18 Claims, 6 Drawing Sheets

(51) Int. Cl.
*F28F 9/02* (2006.01)
*H01M 10/613* (2014.01)
*H01M 10/625* (2014.01)
*H01M 10/6568* (2014.01)

(52) U.S. Cl.
CPC ....... *H01M 10/613* (2015.04); *H01M 10/625* (2015.04); *H01M 10/6568* (2015.04); *H01M 2220/20* (2013.01)

(56) References Cited

U.S. PATENT DOCUMENTS

| | | | | |
|---|---|---|---|---|
| 5,566,720 | A * | 10/1996 | Cheney | F16L 9/121 |
| | | | | 138/140 |
| 5,735,554 | A * | 4/1998 | Imgam | B29C 66/112 |
| | | | | 285/239 |
| 10,385,999 | B2 * | 8/2019 | Canatella | F16L 37/0985 |
| 12,235,054 | B2 * | 2/2025 | Shin | F28F 9/26 |
| 2004/0245776 | A1 * | 12/2004 | Evans | F16L 33/223 |
| | | | | 285/259 |
| 2005/0199308 | A1 * | 9/2005 | Swails | F16L 33/30 |
| | | | | 138/109 |
| 2007/0205601 | A1 * | 9/2007 | Shemtov | F16L 5/06 |
| | | | | 285/151.1 |
| 2020/0049292 | A1 * | 2/2020 | Ferkel | F16L 33/20 |

FOREIGN PATENT DOCUMENTS

| | | | | |
|---|---|---|---|---|
| WO | WO-2017007904 | A1 * | 1/2017 | ......... F16L 37/0985 |
| WO | WO-2020033098 | A1 * | 2/2020 | ............ F16L 37/32 |

* cited by examiner

BARB TYPES

Double Barb

Single Barb

Rounded Single Barb

DEFECT TYPES

HYDRAULIC COUPLING DEVICE

INCORPORATION BY REFERENCE TO ANY PRIORITY APPLICATIONS

Any and all applications for which a foreign or domestic priority claim is identified in the Application Data Sheet or Request as filed with the present application are hereby incorporated by reference under 37 CFR 1.57, and Rules 4.18 and 20.6. This Application is a national stage application of International PCT App. No. PCT/US2022/025398, filed Apr. 19, 2022, which claims priority to U.S. Provisional App. No. 63/177,568, filed Apr. 21, 2021, which are hereby incorporated by reference in their entirety for all purposes.

BACKGROUND

Field

The present invention relates to coupling devices. More specifically, the present invention relates to hydraulic coupling devices for coolant system applications including automotive cooling systems.

Description of the Related Art

Hoses manufactured from traditional plastic and rubber materials are typically used for sealing interfaces. However, typical low-durometer (i.e. hardness) hoses have poor axial stiffness and typical high-durometer hoses require high installation forces, making them ill-suited for straightforward assembly. Furthermore, many typical hoses require hose clamps in order to create reliable seals over their lifetimes and/or suffer from poor robustness to geometric variation and mechanical damage or debris at the sealing interfaces.

As such, it may be desirable to produce a coupling device that may easily be installed and create reliable seals in varying environments.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

In one aspect, a coupling device is disclosed. The coupling device includes an internal material, an external material, flared ends connected by a cylindrical intermediary portion, and a hollow interior portion, wherein a hardness of the internal material is less than a hardness of the external material.

In some embodiments, the internal material is an internal thermoplastic material. In some embodiments, the internal thermoplastic material comprises rubber. In some embodiments, the external material is an external thermoplastic material. In some embodiments, the external thermoplastic material is selected from the group consisting of polypropylene (PP), polybutylene terephthalate (PBT), nylon, and combinations thereof. In some embodiments, a melt temperature of the internal material is less than a melt temperature of the external material.

In some embodiments, the coupling device comprises an internal lubricant disposed over the internal material. In some embodiments, the coupling device does not comprise an internal sealant disposed over the internal material. In some embodiments, the internal and external materials are disposed directly over one another. In some embodiments, the coupling device does not comprise an additional material disposed between the internal and external materials. In some embodiments, the coupling device is able to withstand an internal pressure of at least about 30 psi. In some embodiments, the coupling device is resistant to degradation from contact with ethylene glycol.

In some embodiments, each flared end includes a distal end, a medial portion, and a proximal portion, wherein an internal angle of the device increases from the proximal portion to the medial portion, and from the medial portion to the distal end.

In some embodiments, a battery coolant system is disclosed. The battery coolant system includes a plurality of battery cooling distributers, a plurality of barbs attached to the cooling distributers, a coolant source, and a plurality of coupling devices in fluid communication with each of the plurality of barbs and the coolant source.

In some embodiments, the plurality of coupling devices are configured to maintain an internal pressure of at least about 30 psi when at least one of the plurality of barbs comprises a defect or debris of at most about 250 µm. In some embodiments, the plurality of coupling devices are configured to maintain an internal pressure of at least about 30 psi when at least two adjacent barbs of the plurality of barbs are misaligned. In some embodiments, the system does not comprise an additional attachment device connecting each of the plurality of coupling devices to the plurality of barbs.

In some embodiments, an automotive vehicle comprising the battery coolant system is described. In some embodiments, the automotive vehicle further comprising an electric motor.

DETAILED DESCRIPTION

The present disclosure may be understood by reference to the following detailed description. It is noted that, for purposes of illustrative clarity, certain elements in various drawings may not be drawn to scale, may be represented schematically or conceptually, or otherwise may not correspond exactly to certain physical configurations of embodiments.

Embodiments, relate to a coupling device useful for fluidly connecting components of products, such as vehicle coolant components. The coupling device may be press-fit onto male barb interfaces and thereby create a robust and durable liquid-tight seal. The seal of the coupling device may be resistant to leakage due barb damage (such as mechanical damage and/or surface imperfections), debris and/or radial misalignment of adjacent barbs. The coupling device may allow for autonomous factory installation.

The coupling device may be a cylindrical multilayer device with a relatively rigid outer surface and a pliable inner surface. The ends of the cylindrical device may be flared to receive a barbed end that engages with each flared end. As the barbed end of a connector attempts to mate with the coupling device, the barbed end is received by the flared end. Because the inner material may be pliable, the barbed end of the connector may not align perfectly with the flared end, but still move into a proper mounting position without being damaged. The rigid outer surface prevents the pliable inner surface material from moving or stretching too far in any particular direction upon contact with the barbed end.

In one embodiment, the vehicle is an electric vehicle powered by a battery pack and comprising an electric motor, and wherein the battery pack is cooled by a coolant system. In some embodiments, a coolant system comprises battery cooling distributers, coolant barbs attached to the cooling distributers, a coolant source, and coupling devices. In some embodiments, the coupling devices attach to the barbs and coolant source such that the barbs and coolant source are in fluid communication.

Figure 1A:
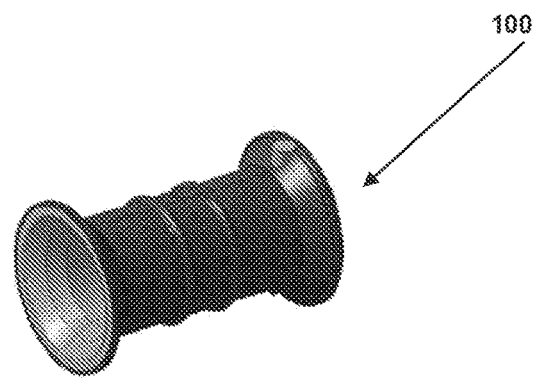
FIG. 1A is a perspective view of one embodiment of a coupling device according to some embodiments.
Figure 1B:
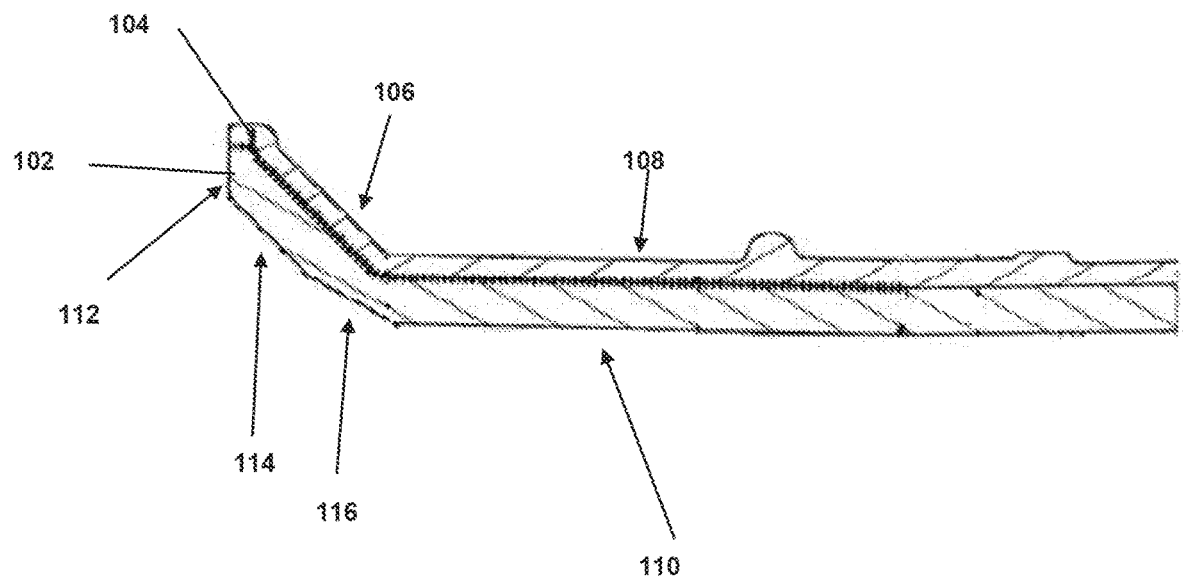
FIG. 1B is a cross-sectional view of one embodiment of the coupling device from FIG. 1A.
Figure 2A:
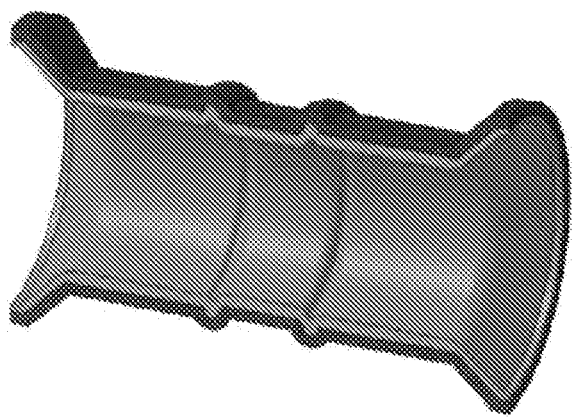
FIG. 2A is a cross-sectional illustration of a coupling device according to some embodiments.
Figure 2B:
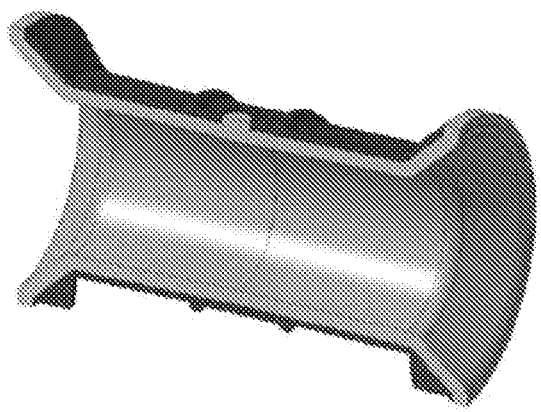
FIG. 2B is a cross-sectional illustration of a coupling device according to some embodiments.
Figure 2C:
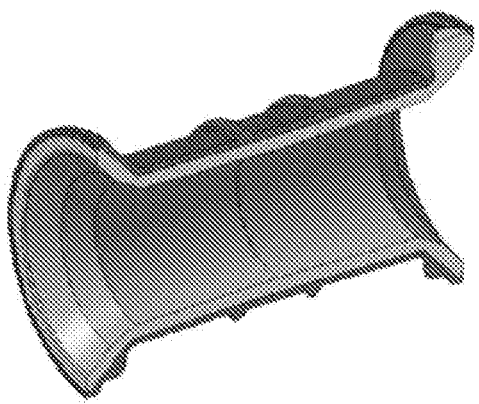
FIG. 2C is a cross-sectional illustration of a coupling device according to some embodiments.
Figure 2D:
FIG. 2D is a drawing of illustration device of FIG. 2C, according to some embodiments.

FIG. 1A shows a perspective view of one embodiment of a coupling device 100 according to some embodiments, and FIG. 1B is a cross-sectional view of one embodiment of the coupling device from FIG. 1A. The coupling device 100 is formed from an internal material 102 and an external material 104, and includes flared ends 106 connected by a cylindrical intermediary portion 108 and a hollow interior portion 110. The flared end 106 includes a distal end 112, a medial portion 114 and a proximal portion 116. As shown in FIG. 1B, the internal angle of the device (relative to normal) increases from the proximal portion 116 to the medial portion 114, and from the medial portion 114 to the distal end 112. FIGS. 2A-2D show additional illustrations of a coupling device according to some embodiments.

The external material is selected to provide durability to the coupling device, and the internal material is selected to provide a robust and durable liquid tight seal when in use. Furthermore, external and internal materials may be selected such that they bond to each other without delamination issues. In some embodiments the internal material is an internal thermoplastic material. In some embodiments, the internal thermoplastic material includes rubber. In some embodiments, the rubber is a nitrile rubber, a butadiene rubber, a butyl rubber, a chloroprene rubber, a ethylene propylene rubber, a fluorocarbon rubber, a fluorosilicone rubber, a hydrogenated nitrile rubber, an isoprene rubber, a natural rubber, a polyacrylate rubber, a silicone rubber, or combinations thereof. In some embodiments, the external material is an external thermoplastic material. In some embodiments, the external thermoplastic material includes polypropylene (PP), polybutylene terephthalate (PBT), nylon, and combinations thereof.

In some embodiments, a melt temperature of the internal material is less than a melt temperature of the external material. In some embodiments, the melt temperature of the internal material is, is about, is at most, or is at most about, 70° C., 80° C., 90° C., 100° C., 110° C., 120° C., 130° C., 140° C., 150° C., 160° C., 170° C., 175° C., 180° C., 190° C., 200° C., 225° C. or 250° C., or any range of values therebetween. In some embodiments, the melt temperature of the external material is, is about, is at least, or is at least about, 100° C., 110° C., 120° C., 130° C., 150° C., 175° C., 200° C., 223° C., 225° C., 250° C., 269° C., 275° C., 300° C., 350° C. or 400° C., or any range of values therebetween. In some embodiments, a hardness of the internal material is less than a hardness of the external material. In some embodiments, the Shore A hardness of the internal material is, is about, is at most, or is at most about, 5, 10, 20, 30, 40, 50, 60, 70, 75, 80, 85, 90, 100 or 120, or any range of values therebetween. In some embodiments, the Shore D hardness of the internal material is, is about, is at most, or is at most about, 10, 15, 20, 25, 30, 35, 40, 45, 50, 55, 60 or 70, or any range of values therebetween. In some embodiments, the Shore A hardness of the external material is, is about, is at least, or is at least about, 90, 100, 110, 120, 130, 140, 150, 160, 180, 200, 225, 250, 275, 300 or 350, or any range of values therebetween. In some embodiments, the Shore D hardness of the external material is, is about, is at least, or is at least about, 50, 55, 60, 65, 70, 75, 80, 85, 90, 95, 100 or 110, or any range of values therebetween.

In some embodiments, the coupling device comprises an internal lubricant disposed over the internal material. In some embodiments, the coupling device does not comprise an internal sealant disposed over the internal material. In some embodiments, the internal and external materials are disposed directly over one another. In some embodiments, the coupling device does not comprise an additional material disposed between the internal and external materials.

The coupling device is configured such that it creates a liquid-tight seal that performs at elevated pressures. In some embodiments, the coupling device is able to withstand an internal pressure of, of about, of at least, or at least about, 10 psi, 20 psi, 22 psi, 24 psi, 26 psi, 28 psi, 30 psi, 35 psi, 40 psi, 45 psi, 50 psi, 60 psi, 80 psi or 100 psi, or any range of values therebetween.

The coupling device may be configured to resist degradation. In some embodiments, the coupling device is resistant to degradation due to mechanical damage, aging damage, chemical damage, and combinations thereof. In some embodiments, the device is resistant to degradation from contact with ethylene glycol. In some embodiments, the device is resistant to degradation from contact with automotive coolant.

Figure 3A:
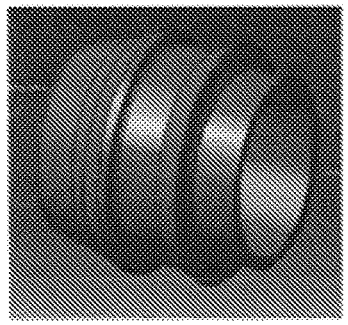
FIG. 3A shows illustrations of different barb types.
Figure 3A:
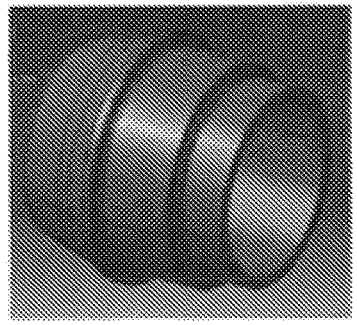
Figure 3A:
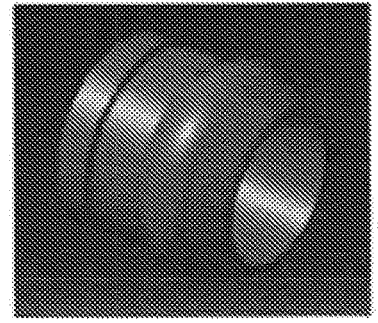
Figure 3B:
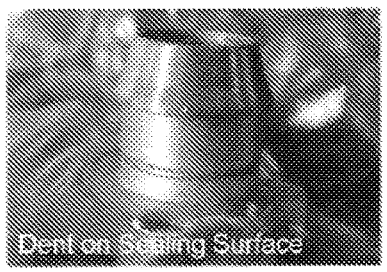
FIG. 3B shows photographs of different barb defect types.
Figure 3B:
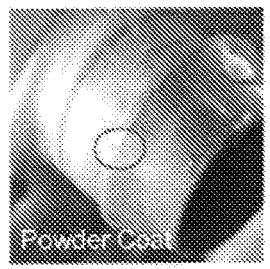
Figure 3B:
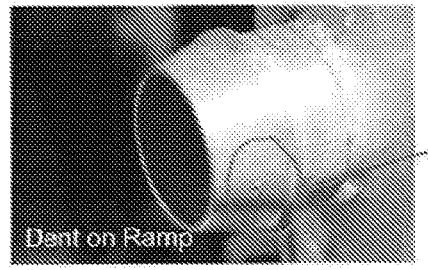
Figure 3C:
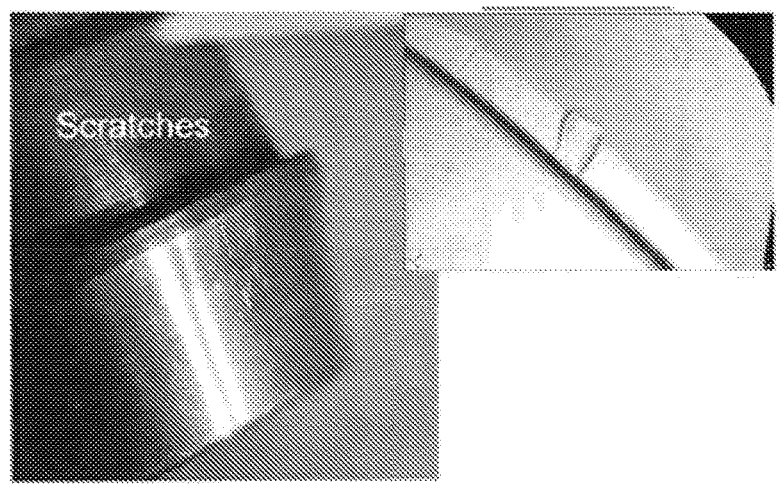
FIG. 3C shows photographs of barb scratches.

The coupling device may be configured to attach to a barb, and thereby create a liquid-tight seal. FIG. 3A shows illustrations of different barb types, including a double barb, single barb and a rounded single barb. FIGS. 3B and 3C shows photographs of different barb defect types, including a barb with a dent on the sealing surface, a powder coat defect, a dent on the ramp, and scratches. In some embodiments, the coupling device can create a robust seal on barbs with defect and debris, such as the barbs shown in FIG. 3A and the defects shown in FIGS. 3B and 3C.

Figure 4A:
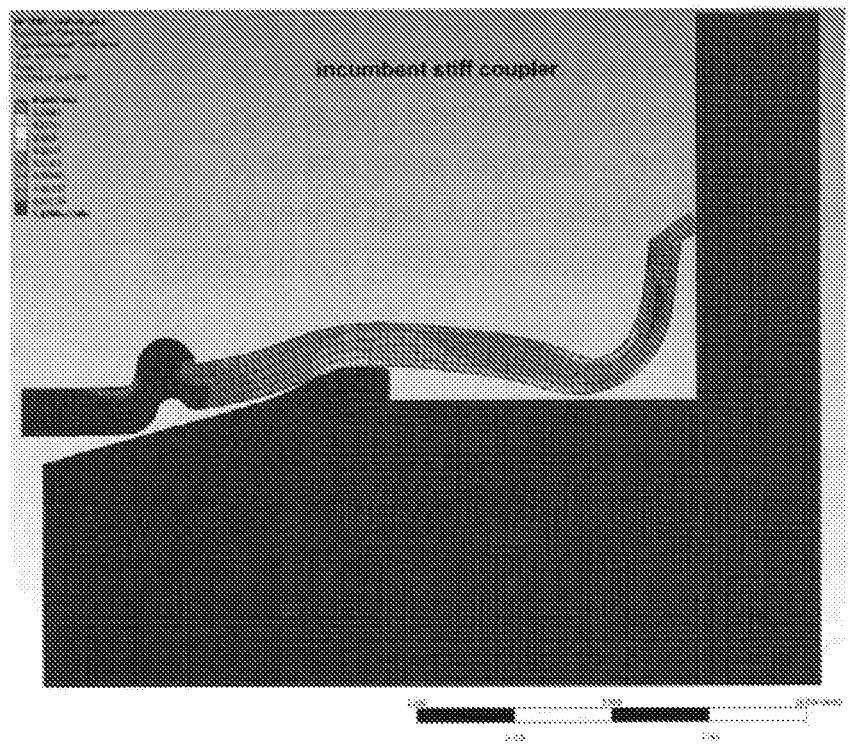
FIG. 4A shows simulated equivalent total strain calculations of a single-material coupling device attached to a barb.
Figure 4B:
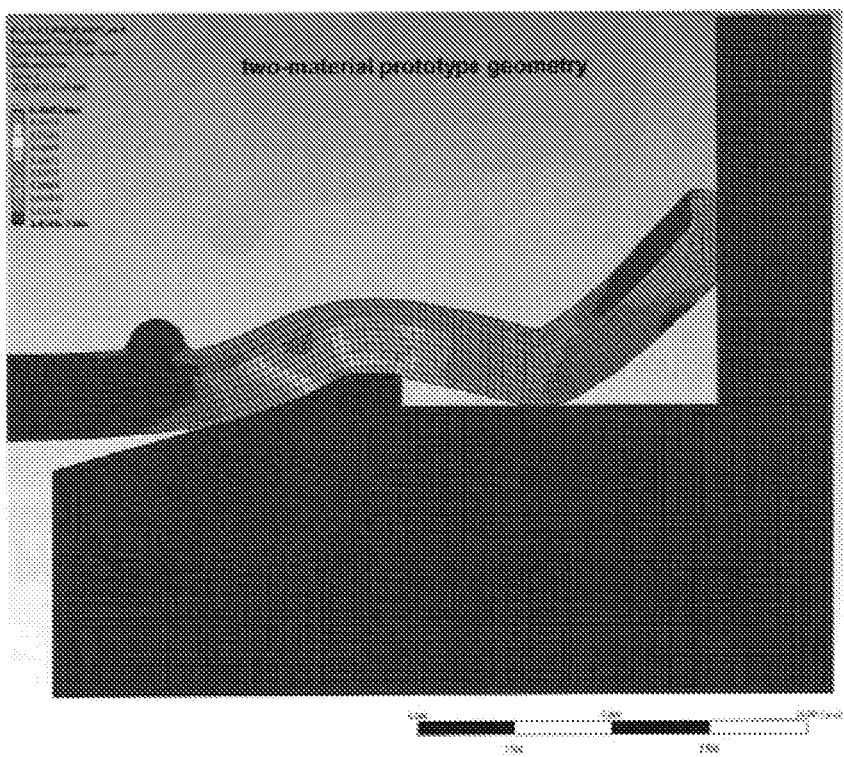
FIG. 4B shows simulated equivalent total strain calculations of a two-material coupling device attached to a barb, according to some embodiments.

FIG. 4A shows simulated equivalent total strain calculations of a single-material coupling device attached to a barb, and FIG. 4B shows simulated equivalent total strain calculations of a two-material coupling device attached to a barb. As demonstrated in the comparisons between FIGS. 4A and 4B the two-material coupling device shows improved total strain when attached to a barb, thereby creating a more effective liquid-tight seal.

Figure 5:
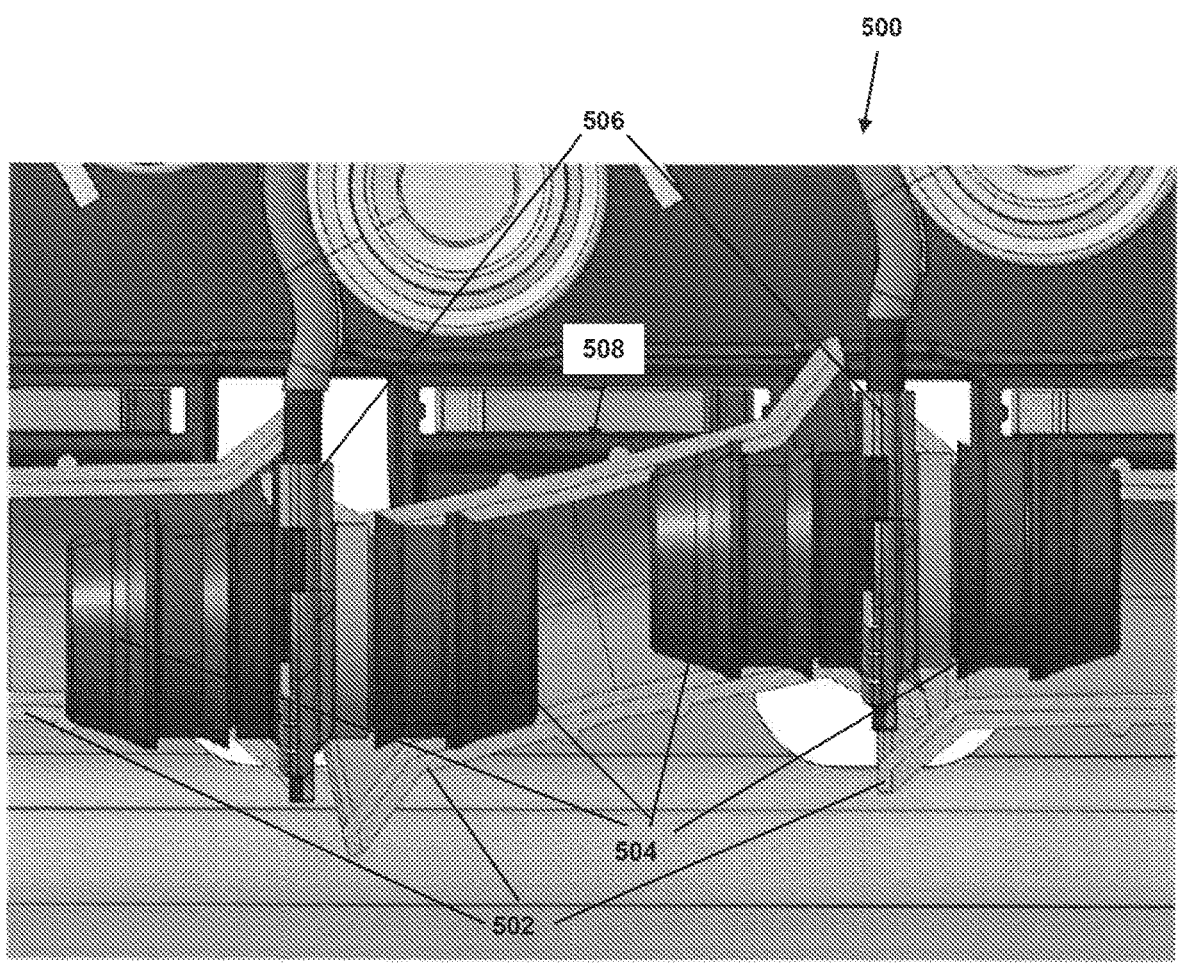
FIG. 5 is an illustration of coupling devices attached to barbs of a cooling system according to some embodiments.
Figure 6:
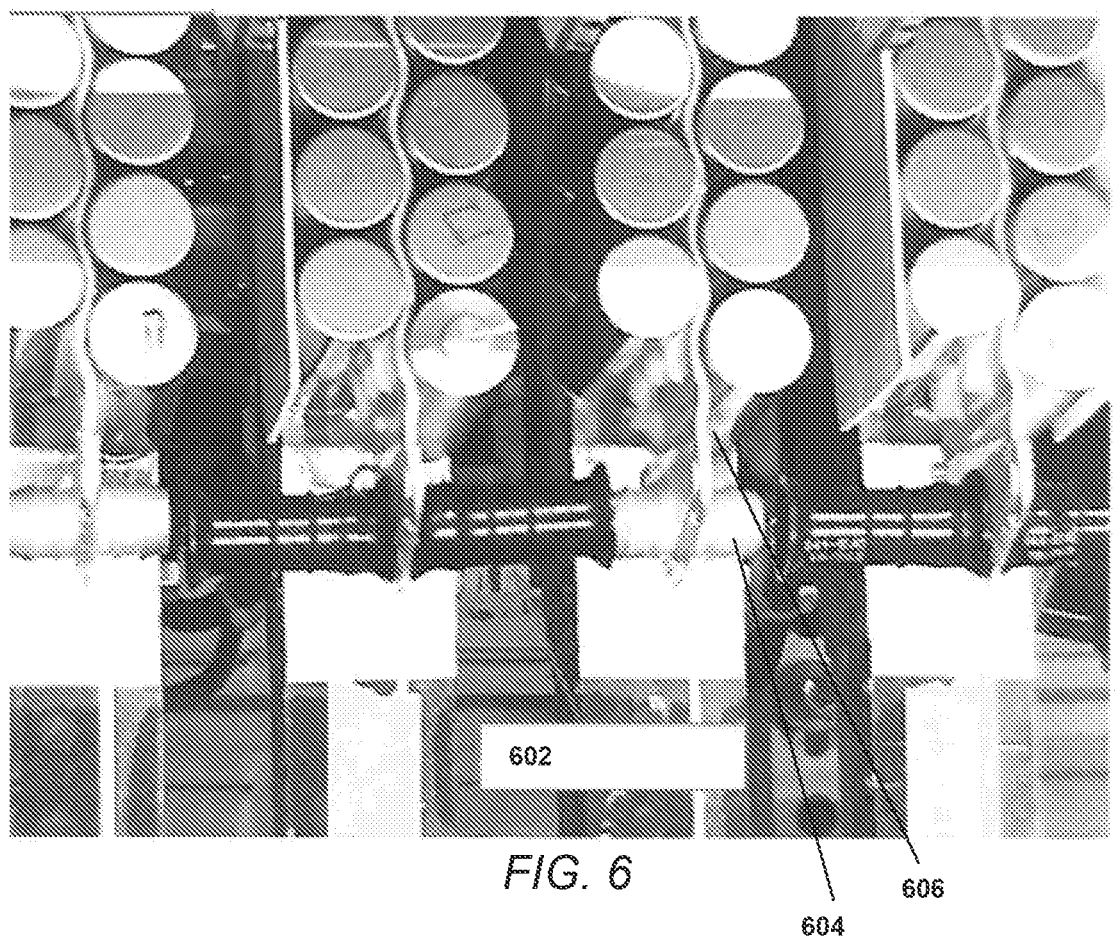
FIG. 6 is a photograph of coupling devices attached to battery cooling system according to some embodiments.

The coupling device may be used to attach to barbs of a cooling system. In some embodiments, the cooling system may be cooling system of a battery system. In some embodiments, the battery system is a battery system of an automotive vehicle. FIG. 5 is an illustration of coupling devices 502 attached to barbs 504 of a cooling system 500. The barbs 504 of the cooling system 500 connect to cooling distributers 506, wherein the coupling devices 502 when attached to the barbs 504 are configured to allow the barbs 504, the cooling distributers 506 and a coolant source (not depicted) to be in fluid communication. Furthermore, coupling devices 502 allow for robust liquid-tight seals even when the barbs are misaligned 508. FIG. 6 is a photograph of coupling devices 602 attached barbs 604 connected to cooling distributers 606 of a battery cooling system 600.

In some embodiments, the plurality of coupling devices are configured to maintain an internal pressure of at least about 30 psi when at least one of the plurality of barbs comprises a defect or debris of, of about, of at most, or of at most about, 100 µm, 150 µm, 200 µm, 225 µm, 250 µm, 275 µm, 300 µm, 350 µm, 400 µm, 450 µm, 500 µm, 600 µm, 800 µm or 100 µm, or any range of values therebetween. In some embodiments, the plurality of coupling devices are configured to maintain an internal pressure of at least about 30 psi when at least two adjacent barbs of the plurality of barbs are misaligned. In some embodiments, two adjacent barbs of the plurality of barbs are misaligned by, by about, by at least, or by at least about, 0.5 cm, 1 cm, 2 cm, 3 cm, 4 cm, 5 cm, 6 cm, 8 cm, 10 cm, 12 cm, 14 cm, 15 cm or 20 cm, or any range of values therebetween. In some embodiments, the system does not comprise an additional attachment device connecting each of the plurality of coupling devices to the plurality of barbs.

In some embodiments, an automotive vehicle includes the battery coolant system comprising the coupling device. In some embodiments, the automotive vehicle further includes an electric motor.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. A coupling device comprising:
    an internal material;
    an external material;
    flared ends connected by a cylindrical intermediary portion, wherein each flared end comprises:
        a distal end;
        a medial portion; and
        a proximal portion;
        wherein an internal angle of the device increases from the proximal portion to the medial portion, and from the medial portion to the distal end; and
    a hollow interior portion;
    wherein a hardness of the internal material is less than a hardness of the external material.

2. The device of claim 1, wherein the internal material is an internal thermoplastic material.

3. The device of claim 2, wherein the internal thermoplastic material comprises rubber.

4. The device of claim 1, wherein the external material is an external thermoplastic material.

5. The device of claim 4, wherein the external thermoplastic material is selected from the group consisting of polypropylene (PP), polybutylene terephthalate (PBT), nylon, and combinations thereof.

6. The device of claim 1, wherein a melt temperature of the internal material is less than a melt temperature of the external material.

7. The device of claim 1, wherein the coupling device comprises an internal lubricant disposed over the internal material.

8. The device of claim 1, wherein the coupling device does not comprise an internal sealant disposed over the internal material.

9. The device of claim 1, wherein the internal and external materials are disposed directly over one another.

10. The device of claim 1, wherein the coupling device does not comprise an additional material disposed between the internal and external materials.

11. The device of claim 1, wherein the coupling device is able to withstand an internal pressure of at least about 30 psi.

12. The device of claim 1, wherein the coupling device is resistant to degradation from contact with ethylene glycol.

13. A battery coolant system comprising:
    a plurality of battery cooling distributers;
    a plurality of barbs attached to the cooling distributers;
    a coolant source; and
    a plurality of coupling devices of claim 1 in fluid communication with each of the plurality of barbs and the coolant source.

14. The system of claim 13, wherein the plurality of coupling devices are configured to maintain an internal pressure of at least about 30 psi when at least one of the plurality of barbs comprises a defect or debris of at most about 250 μm.

15. The system of claim 13, wherein the plurality of coupling devices are configured to maintain an internal pressure of at least about 30 psi when at least two adjacent barbs of the plurality of barbs are misaligned.

16. The system of claim 13, wherein the system does not comprise an additional attachment device connecting each of the plurality of coupling devices to the plurality of barbs.

17. An automotive vehicle comprising the battery coolant system of any one of claim 13.

18. The automotive vehicle of claim 17, further comprising an electric motor.

* * * * *